United States Patent [19]

Ding et al.

[11] Patent Number: 4,804,905
[45] Date of Patent: Feb. 14, 1989

[54] CAPACITIVE MEASURING SYSTEM FOR MEASURING THE DISTANCE BETWEEN TWO RELATIVELY MOVABLE PARTS

[75] Inventors: Kurt Ding, Augsburg; Hartwig Knoell, Munich; Josef Wenzl, Herbertshausen; Hermann Biebl, Karlsfeld, all of Fed. Rep. of Germany

[73] Assignee: MTU of Postfach, Munich, Fed. Rep. of Germany

[21] Appl. No.: 905,485

[22] Filed: Sep. 8, 1986

Related U.S. Application Data

[63] Continuation-in-part of Ser. No. 773,261, Sep. 6, 1985.

[30] Foreign Application Priority Data

Sep. 11, 1984 [DE] Fed. Rep. of Germany ....... 3433351

[51] Int. Cl.$^4$ ........................... G01R 27/26; H01J 5/00
[52] U.S. Cl. ............................... 324/61 P; 324/61 R; 174/152 GM; 174/50.55
[58] Field of Search ........................... 324/61 R, 61 P; 740/870.37; 73/462; 174/152 GM, 152 R, 50.55; 361/179, 181

[56] References Cited

U.S. PATENT DOCUMENTS

| | | | |
|---|---|---|---|
| 2,802,178 | 8/1957 | Shafer et al. | 324/61 P |
| 3,027,769 | 4/1962 | Coon | 324/61 P |
| 3,400,331 | 9/1968 | Harris | 324/61 R |
| 3,628,136 | 12/1971 | Jonas | 324/61 |
| 4,329,644 | 5/1982 | Libertini et al. | 324/61 P |
| 4,395,827 | 8/1983 | Stowe et al. | 33/181 R |

FOREIGN PATENT DOCUMENTS

| | | |
|---|---|---|
| 2496871 | 6/1982 | France . |
| 2568004 | 1/1986 | France . |
| 2071852A | 9/1981 | United Kingdom ............. 324/61 P |

OTHER PUBLICATIONS

Engineer Publication, Feb. 20, 1953, I.A. Mossop and F.D. Gill, pp. 291-292.

*Primary Examiner*—Reinhard J. Eisenzopf
*Assistant Examiner*—Jack B. Harvey
*Attorney, Agent, or Firm*—Roberts, Spiecens & Cohen

[57] ABSTRACT

A capacitive measuring system including a sensor for measuring the clearance between a movable part and a fixed casing facing the movable part, the sensor is secured in the casing and has an active face facing the movable part to constitute a capacitor whose charge is representative of the clearance. A triaxial cable connects the sensor to an amplifier. The triaxial cable has a central conductive core and two surrounding conductors insulated from one another and from the core. The sensor comprises a central body including a disk with a surface constituting the active face of the sensor made from a metal of the platinum group (VIII) or an alloy thereof. The central body is connected to the core of the triaxial cable. Two conductive shields surround the central body and are connected to respective conductors of the triaxial cable. An electrical shielding or insulation of ceramic or glass is between the central body and the conductive shields. The conductive shields are made of a metal having a substantially lower coefficient of thermal expansion than the central body. The sensor is secured with axial adjustment in the casing, in such manner that accurate active clearance control of a machine, such as a turbo-engine, jet-engine or the like power plant is provided.

13 Claims, 6 Drawing Sheets

CAPACITIVE MEASURING SYSTEM FOR MEASURING THE DISTANCE BETWEEN TWO RELATIVELY MOVABLE PARTS

CROSS RELATED APPLICATION

This application in a Continuation-In-Part of Application 773,261 filed Sept. 6, 1985, pending.

FIELD OF THE INVENTION

The invention relates to improvements in a capacitive measuring system in which variation in capacitance between two relatively movable elements is a function of the spacing therebetween.

More particularly, the invention relates to improvements in a capacitive measuring system for measuring the gap or clearance between a movable element such as the tip of a rotor blade and the facing stationary casing, and its application in an active clearance control system.

PRIOR ART

When two parts are in relative movement, such as components of machines, more particularly all types of turbomachines, it is important to know the clearance or gap between the parts as accurately as possible. For turbomachines, the size of the gap between the rotor blade and the casing affects the leakage losses, which, in turn, directly affects the efficiency of the machine.

A capactive measuring system is disclosed in U.S. patent application Ser. No. 773,261 in which measurements of the gap can be carried out without interferring with the normal operation of the turbomachine.

However, in this system, the sensitivity is somewhat limited and its installation is complex.

SUMMARY OF THE INVENTION

It is an object of the invention to provide improvements in the capacitive measuring system in U.S. patent application Ser. No. 773,261 so that the sensitivity is increased and the installation is simplified, furthermore its application in active clearance control of an engine.

In order to achieve the above object, the capacitive measuring system comprises a sensor having a central body including a disk with a surface constituting the active face of the sensor. The surface is a metal of the platinum group (VIII) or an alloy thereof. The sensor is connected to a triaxial cable and specifically the central body is connected to the core of the triaxial cable while two conductive shields coaxially surrounding the central body are connected to respective conductors of the triaxial cable. The central body and the two conductive shields are electrically insulated from one another by ceramic or glass material. The conductive shields are made of a metal having a substantially lower coefficient of thermal expansion than that of the central body. In a particular embodiment, the shields can be made of Inconel or Vacon. The sensor is secured in a fixed casing of the capacitive measuring system with capability of axial adjustment.

Because of the structural shape of the sensor, it has a small height which permits wide possibilities of installation. The installing and removal of the sensor are facilitated, as is its replacement thereof. The installation of the sensor with respect to a stop is adjustable and the sensor is mounted in a manner which is insensitive to vibration. The installation and connection of the sensor are sealed against fluids and insensitive to temperature so that the precision of the measurement is substantially not affected. The active sensor face can be precisely fixed and the front surface of the sensor can be adapted to the contour of the casing. The measuring device can be utilized for the measurements of the actual operating clearance and its adjustment in each case for individual components of a turbomachine, but can be used in conjuction with the operating conditions to achieve control functions.

The capacitive measuring system of the present invention is suitable for stationary as well as transient measurements and more importantly, also for measurements for individual blades.

The measuring system can be calibrated simply and safely when the machine is at rest, for example, by moving the sensor towards a stationary blade of a bladed rotor and modulating the bias voltage ($U_{ref}$).

The measuring system is made insensitive to vibration by virtue of active direct voltage shielding means employed in the sensor and cable. Considering that the charge flowing in and from the gap capacitance is measured, changes in cable or sensor capacitance caused by temperature variations will not affect the reading.

The system enables measurements to be made for individual blade lengths at blade alternation frequencies as high as about 50 Khz.

Measurements can be made of the gap-versus-time profile for transient changes (accelerations, decelerations).

The sensor of the measuring system can be made rather small, and fitted with a flexible connecting cable into small casing openings. Without cooling it will be operative at temperature up to 600° C.

The measuring system is provided with fast measuring electronic means to determine the amplitude of the signal of the successive blade pulses and it permits rapid conversion of the measured signal amplitude into a gap value and into digital and/or analog gap output values.

BRIEF DESCRIPTION OF THE FIGURES OF THE DRAWING

The accompanying drawing diagrammatically shows embodiments of the present invention.

FIG. 8b is a bottom plan view of the sensor in FIG. 8a.

DETAILED DESCRIPTION OF THE PREFERRED EMBODIMENTS

Figure 1A:
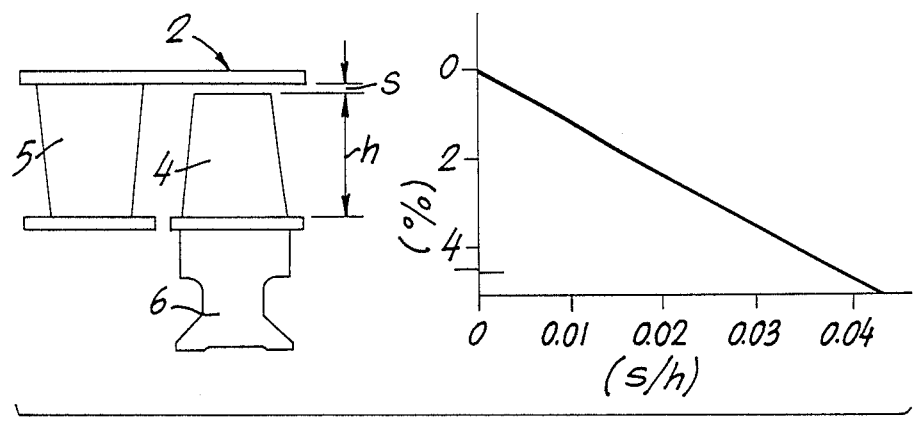
FIG. 1a diagrammatically illustrates an axial-flow turbine and corresponding graphical illustration of efficiency versus rotor gap.

With reference to FIG. 1a, therein is seen a rotor of an axial-flow turbine having rotor blades 4 of a length h forming a clearance or gap s relative to a casing 2 having a stator or stationary ring of vanes 5. The graph next to the rotor shows percent loss in efficiency versus relative radial rotor gap. The two paramaters are seen to vary linearly.

Figure 1B:
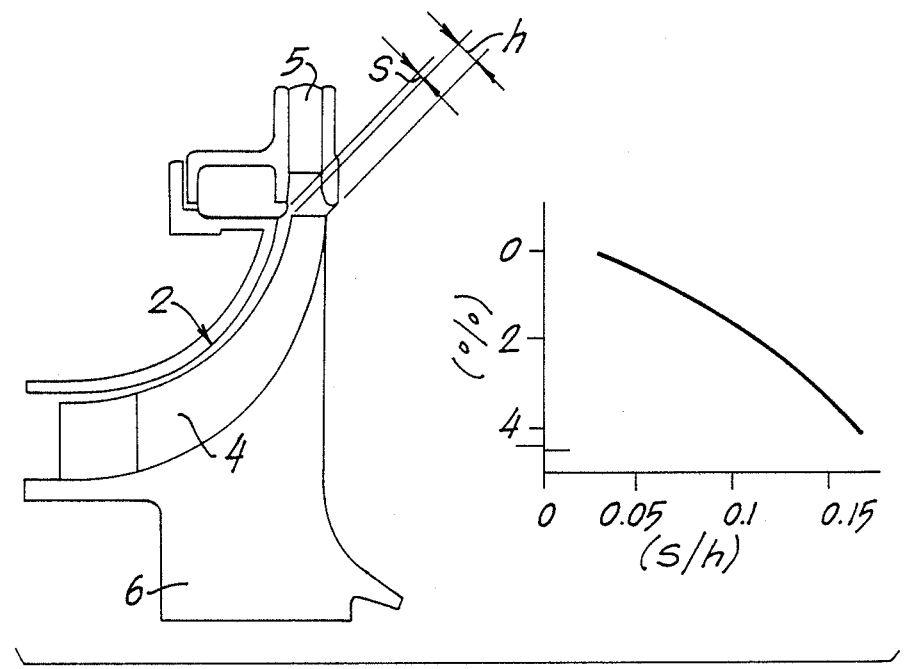
FIG. 1b diagrammatically illustrates a radial-flow compressor and corresponding graphical illustration of efficiency versus rotor gap.

FIG. 1b shows a radial-flow compressor with its rotor 6 and an outer casing 2 with its stator or ring of stator vanes 5. As in FIG. 1a the effective length of the rotor blade is again designated by reference character h and the gap between the rotor and the casing is designated by reference character s. The accompanying graph shows the percent loss in efficiency versus relative axial rotor gap. This graph applies not only to compressors, but also to pumps, blowers, ventilators, turbochargers, and similar machines. As distinguished from FIG. 1a, the relation between the parameters in FIG. 1b is curved rather than linear.

Figure 2:
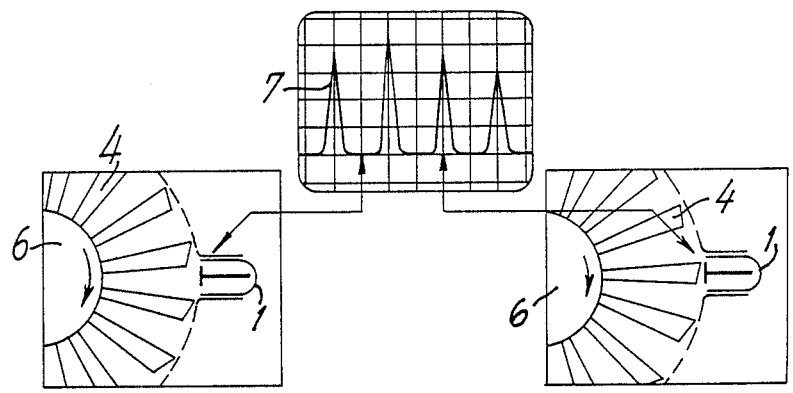
FIG. 2 diagrammatically illustrates measurement signals generated at respective positions of a bladed rotor relative to a sensor of the measuring system arranged in accordance with the present invention.

FIG. 2 diagrammatically illustrates the position of a sensor 1 relative to the tip of the blade of the rotor 6, and the measurement signals generated by the use of the sensor 1. In the left-hand portion of FIG. 2, the sensor 1 faces the space between two adjacent blades, and in the right-hand portion of FIG. 2 the sensor 1 faces the tip of a horizontally extending blade. The direction of rotation of rotor 6 is indicated by the arrows. An output signal 7 from an amplifier and its correspondence with a particular blade/sensor position is shown by lines with arrowheads at its ends. In the center of each space between the blades, the output signal is a minimum, while it is a maximum (peak voltage) when the distance, i.e., the gap between the blade tip and the sensor is a minimum.

Figure 3:
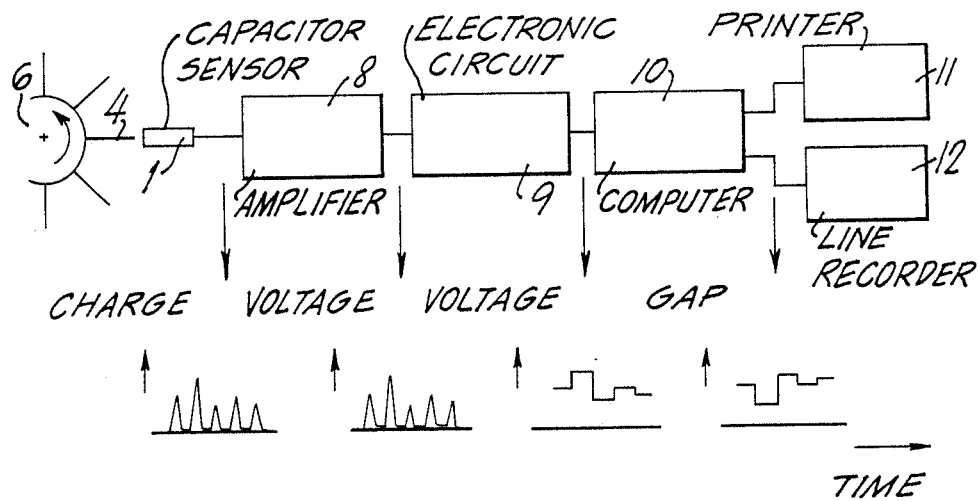
FIG. 3 is a block diagram of the measuring system of the invention.

In FIG. 3 is shown a measuring system which comprises, when viewed from left to right, rotor 6 and capacitive sensor 1 mounted in the casing. The sensor 1 faces the tip of blade 4 and capacitance-to-charge conversion takes place in the sensor. A charge-to-voltage conversion and generation of a sensor voltage is effected in a charge amplifier 8 connected to sensor 1. Signal conditioning, peak value measurement and digitalization take place in an electronic conditioning circuit 9 connected to amplifier 8. System control and gap computation are effected in a computer 10, and the output is fed to a printer 11 or continuous-line recorder 12. Use can optionally be made also of the other data output and/or plotting or recording means.

Figure 4:
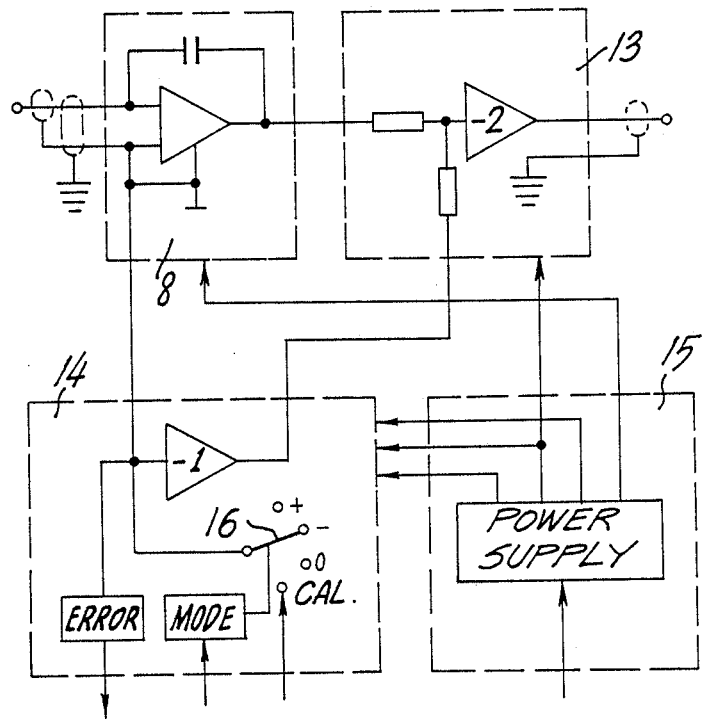
FIG. 4 schematically illustrates the components in the measuring system.

FIG. 4 shows a block diagram of the charge amplifier/sensor voltage unit consisting of the charge amplifier 8, a differential amplifier 13, a sensor voltage source 14 and a power supply 15, which serves for charge-to-voltage conversion and production of sensor voltage.

The charge amplifier 8 and the differential amplifier 13 are connected in series. The output of the charge amplifier 8, which is referenced to ground by the differential amplifier 13, is supplied to the electronic conditioning circuit 9. The charge amplifier 8 is also connected to the sensor voltage source 14.

Figure 5:
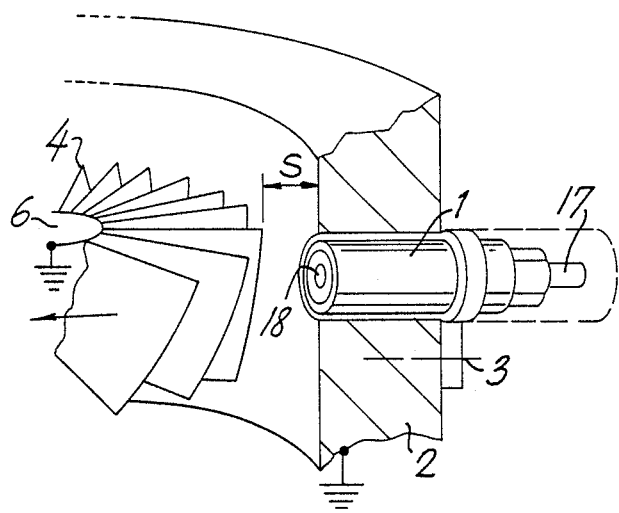
FIG. 5 is a perspective view, partly broken away, illustrating a sensor installed in a stationary casing and an associated rotor.
Figure 6:
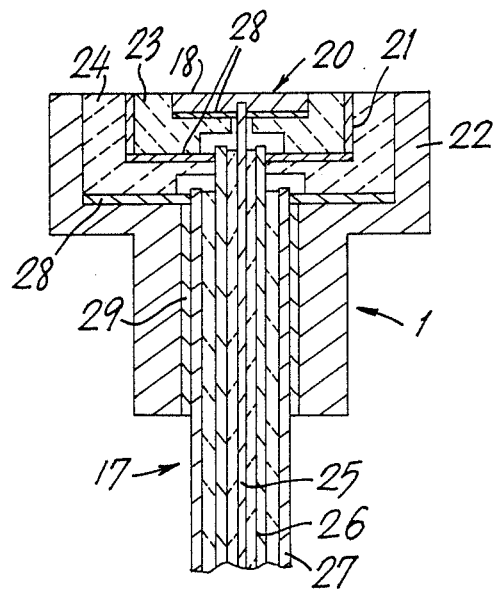
FIG. 6 is a longitudinal view through the sensor in FIG. 5.
Figure 7:
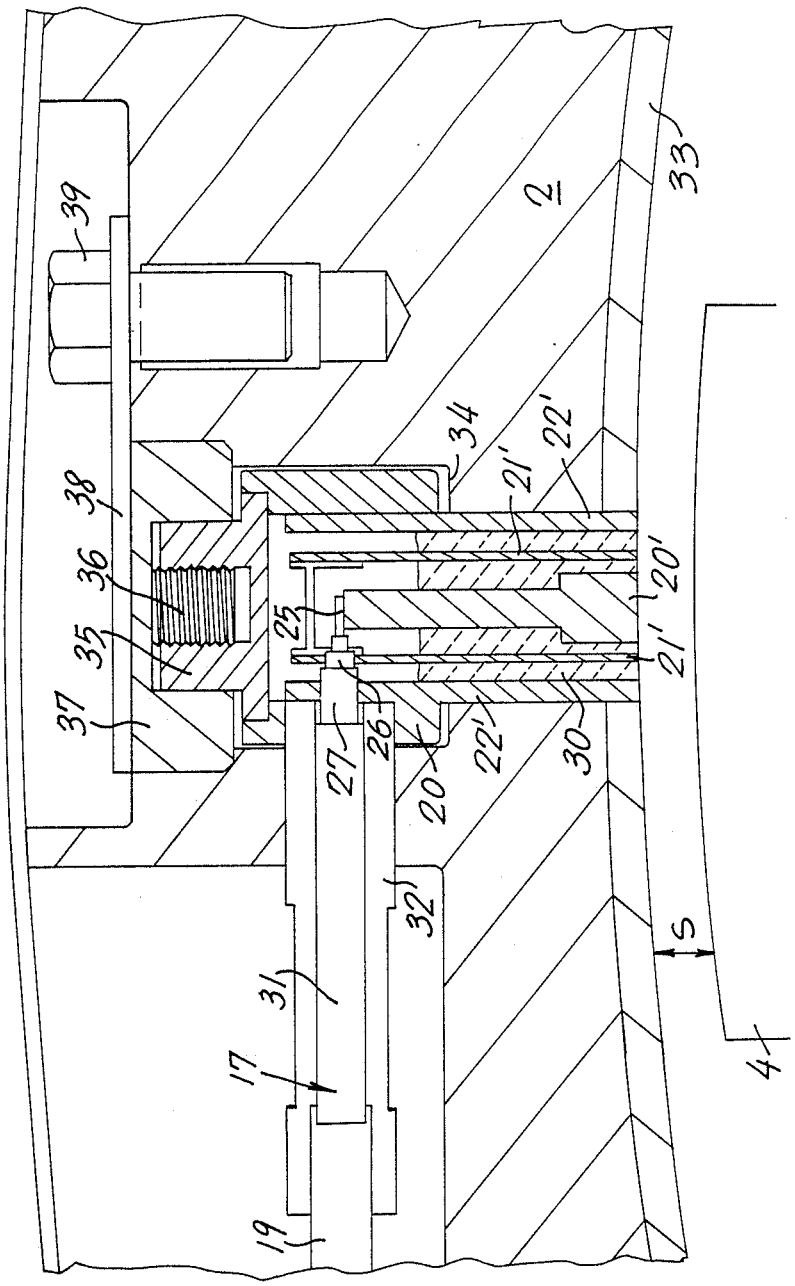
FIG. 7 is a sectional view through a turbomachine casing with an installed sensor.

FIGS. 5 and 7 show spatial sensor arrangements in the casing 2 of a turbomachine. The association of the sensor 1 and casing 2 with the rotor is shown in perspective view in FIG. 5. The active sensor face 18 of the sensor 1 and a triaxial arrangement of electrodes and insulation layers in the sensor 1 are evident from FIGS. 5 and 6. The sensor 1 is fitted in the casing 2 of the turbomachine to permit calibration in situ, and at a safe distance from the longest rotor blade. The gap between the rotor, and specifically the blade tips thereof, and the casing is indicated at s. FIG. 6 shows the sensor 1 in FIG. 5 in section in more detail. Namely, in FIG. 7 the sensor 1 is shown installed in a multi-element stator. The sensor 1 is secured in casing 2. The distance from the active face of the sensor 1 to the tip of blade 4 of rotor 6 is seen at s.

Figure 8A:
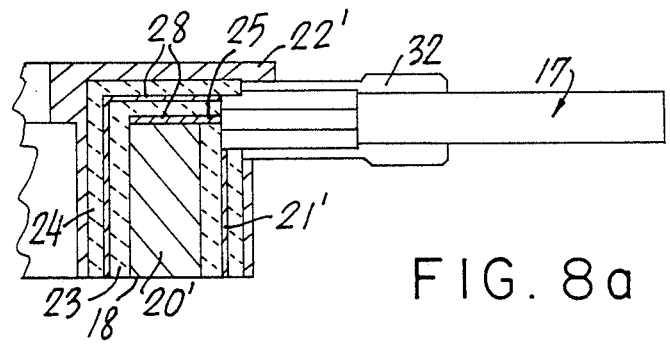
FIG. 8a is a partial sectional view through a sensor similar to the sensor in FIG. 7.

It can be seen that the sensor 1 is small and can be easily installed and connected. By way of example, the diameter of the sensor in FIG. 6 is about 10 mm and its length is less. A triaxial connecting cable 17 is directly connected to the sensor at the end thereof remote from the blade tip. In FIG. 8a the cable 17 extends at right angles to the axis of the sensor 1. The charge amplifier unit (shown in FIG. 4) is preferably accommodated in a special rugged housing 19, together with the sensor voltage source 14 and the power supply 15.

If the gap capacitor is biased at a constant direct voltage $U_{ref}$ relative to the rotor, the active sensor face 18 is electrically charged and discharged during every passage of the blade therepast. If the active sensor face 18 is connected to the charge amplifier 8, a voltage signal $U_A$ is generated at its output which is a measure of the charge Q at its input.

The maximum charge $Q_{imax}$ for each blade passage varies with the capacitance of the gap capacitor $C_{si}$ and thus with the distance s of the individual blade 4 from the sensor in accordance with the equation:

$$Q_{imax} = C_{si} \times U_{ref} \times f(s)$$

where f(s) represents the relationship between gap and capacitance as determined by calibration.

Since the charge amplifier 8 is connected to the sensor 1 by triaxial cable 17 in an insulated manner, the core and protective shield of the sensor are at the same potential, any variations in the self capacitance of the sensor or the cable in the area between the protective shield and the core of sensor 1 are not sensed by the charge amplifier 8, there being no charge shifting by recharging, for the reason that this area of the capacitor is at the same potential on both sides, whereby only the capacitance of the gap capacitor is fed to amplifier 8 and this varies with the distance between the sensor 1 and the blade 4. The distance s between the sensor 1 and the longest blade 4 can be freely selected. However, if the sensor 1 is arranged as close as possible to the blade 4 the sensitivity is maximized. The active face 18 of the sensor 1 can conform to the inner contour of the casing 2 if it should be other than planar.

The sensor 1 installed in the casing 2 forms, together with the blade tip 4, a gap capacitor whose plate spacing is measured and recorded or displayed. With the position of the active sensor face 18 in the casing being known, the plate spacing will directly yield the rotor gap s.

The charge of the gap capacitor is converted by the charge amplifier 8, of high frequency band width, into the voltage signal 7 indicated in FIG. 2. The band width of the charge amplifier 8 is advantageously tuned to suit the frequency of the anticipated charge signal. In order not to reduce the upper cutoff frequency of the charge amplifier, the sensor cable 17 is kept as short as possible.

The electronic conditioning circuit 9 serves to measure and digitalize the peak value of each blade pulse after the signal has been filtered and amplified. The pulse amplitude values so determined are than transmitted in parallel as bits to the computer 10.

The computer 10 controls the measuring cycle in accordance with the operating mode selected by the user and converts the readings in volts into gap values s in mm.

The operating modes available for selection at selector 16 (FIG. 4) are:
 (a) steady state
 (b) transient measurement
 (c) single blade measurement
 (d) calibration Distinction must be made between steady state and transient measuring operations. If the measurement is made twice with different polarities of the sensor bias voltage, and if the arithmetic mean is then taken, a gap signal varying with the sensor bias voltage is obtained when the rotor is poorly grounded. Pole reversal of the sensor bias voltage should be made at a clock frequency adapted to suit the respective application. The clock frequency can be readily determined experimentally and differently for steady state and transient measurements. In the steady state operating mode, the sensor bias voltage polarity can be reversed automatically after a predetermined period of time has elapsed. In the transient operating mode, the polarity reversal can be interrupted, e.g. during rapid acceleration or deceleration phases of the machine. A correction factor is then determined for a single reversal process. The computer automatically processes this correction factor for gap signal values picked up at one polarity, as in this example.

The computer can indicate, regardless of the operating mode, the smallest gap per revolution, the largest gap, or the average gap. Also possible is a single blade measurement, where the gap values are determined and recorded for each blade at the circumference thereof. The readings are output differently for steady state and transient measurement, respectively.

Calibration prior to measuring is achieved as follows:

The sensor 1 is moved relative to the casing 2 in the direction towards the moving part, i.e. the blades 4 of the rotor 6. Periodic modulation of the reference voltage (sensor bias voltage) changes the charge of the capacitor, which consists of the sensor and the blade, to generate a calibration signal.

Modifications of the described embodiments can be made without changing the scope of the invention. Other applications in addition to those described can also be used. The measurement system can be fully automated with respect to control, evaluation and error monitoring and can be operated in a multi-channel mode. The invention is furthermore not limited to turbomachines but can be used, in general, on engines and machines and as a clearance measurement sensor in machine tools or manipulator systems such as robots, electrical machines and also on machines such as electric motors and electric generators for optimum adjustment of the clearance between the rotors and stators thereof. In this way, their magnetic efficiency can be improved.

Figure 8B:
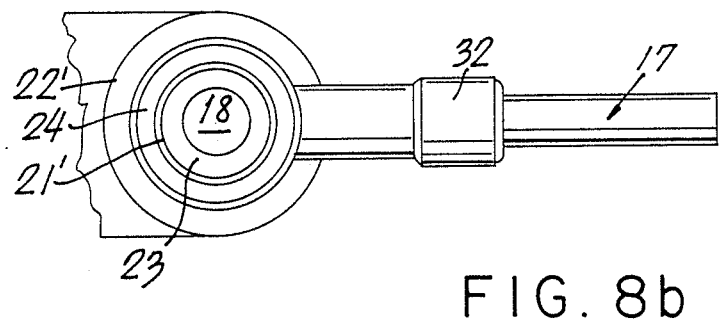

The senor 1 can be axially connected to triaxial cable 17 as shown in FIGS. 5 and 6 or angularly as shown in the right angle arrangements in FIG. 7 and FIGS. 8a and 8b. The latter embodiment is preferred.

As seen in FIG. 6, the active face 18 of sensor 1 is formed on a disk 20 to face the tips of the blades of the rotor. The face 18 as a top layer, or the disk 20 itself, is made of a metal of the platinum group (VIII—group of elements) or an alloy thereof. In a particular embodiment, the disk 20 is made of platinum. The disk 20 is surrounded, in spaced relation, by a conductive shield 21 of metal and a grounded outer housing 22. The shield 21 and housing 22 are made of a metal having minimum values of coefficient of thermal expansion such as Inconel or Vacon. An inner ceramic insulator 23 of aluminum oxide insulates the disk 20 from the shield 21 and an outer ceramic insulator 24, insulates the shield 21 from the outer housing 22. In general, the insulators 23 and 24 can be made of ceramic or glass and can be fused or pressed in place. In the embodiment in FIG. 6 the insulators 23 and 24 are made of aluminum oxide ceramic and they can be vacuum soldered to the metal parts. Housing 22 could be made partly of an insulating material.

The triaxial cable 17 comprises a central inner conductive core 25 connected to disk 20, an intermediate conductor 26 connected to shield 21 and an outer conductor 27 connected to housing 22. The conductors 25, 26, 27 of cable 17 are insulated from one another by mineral insulation such as magnesium oxide. The cable 17 can be a conventional triaxial cable as supplied by the BICC company. The conductors 25, 26, 27 of cable 17 are respectively connected to the disk 20, shield 21, housing 22 of the sensor 1 by solder layers 28 produced by vacuum soldering. The cable 17 is additionally connected to housing 22 by a solder layer 29 produced by vacuum soldering or by brazing or the like. The embodiment in FIG. 6 is operative at temperatures up to 750° C.

The embodiment in FIG. 7 is similar to that in FIG. 6 and similar parts will be designated by the same numerals with primes.

The sensor comprises a central core 20' surrounded by a hollow cylindrical shield 21' and outer housing 22'. The core 20' has a top layer which is made of platinum and forming the active face 18. Shield 21' and outer housing 22' are made of Inconel and are insulated by insulator 30 consisting of glass which is fused in place. The triaxial cable 17 is comprised of the conductors 25, 26, 27 with flexible Teflon insulation between the conductors and a flexible Teflon outer sheathing 31. The cable 17 is flexible. The cable is secured to the sensor by being inserted into a socket extension 32 on housing 22' and mechanically crimped therewithin.

FIGS. 8a and 8b show an embodiment similar to that in FIG. 7 insofar that the sensor and the triaxial cable extend at right angles to one another. The same reference characters are used to designate the elements common to the previously described embodiments. The triaxial cable is a mineral-insulated metal sheathed cable which is connected by brazing or welding to the socket 32 of the outer housing of the sensor. This embodiment is suitable for temperature up to 400° C.

Referring again to FIG. 7, therein is seen a coating 33 having good running-in properties on the inside of the casing wall opposite the tips of the blades 4. The housing 22' of the sensor is installed in the casing 2 by being inserted from the outside i.e. from above in FIG. 7 into a bore in the casing until the outer housing 22' of the sensor abuts against a shoulder 34 in the casing. The sensor is held in place in the housing by means of a lock nut 35 which is secured in a recess in housing 22' and which is threaded onto a stud 36 of an outer nut 37 secured by a holding plate 38 to the casing 2 of the turbine by a bolt 39. As the layer 33 wears, the sensor can be retracted in the bore in the casing by advancing stud 36 into nut 35. In order to achieve precise conformance of the sensor face with the surface of the casing, the face of the sensor can be carefully machined by grinding from the center radially outwards. The amount of relatively coarse adjustment due to the threading of stud 36 into nut 35 and the fine adjustment due to machining is relatively small and can be accommodated by the flexibility of the coaxial cable 17.

The sensors of the invention will next be described in conjunction with their utilization in an otherwise conventional active clearance control system for a gas turbine. In particular FIG. 9 diagrammatically illustrates a system for active clearance control for a gas turbine which utlizes the sensors of the invention.

Figure 9:
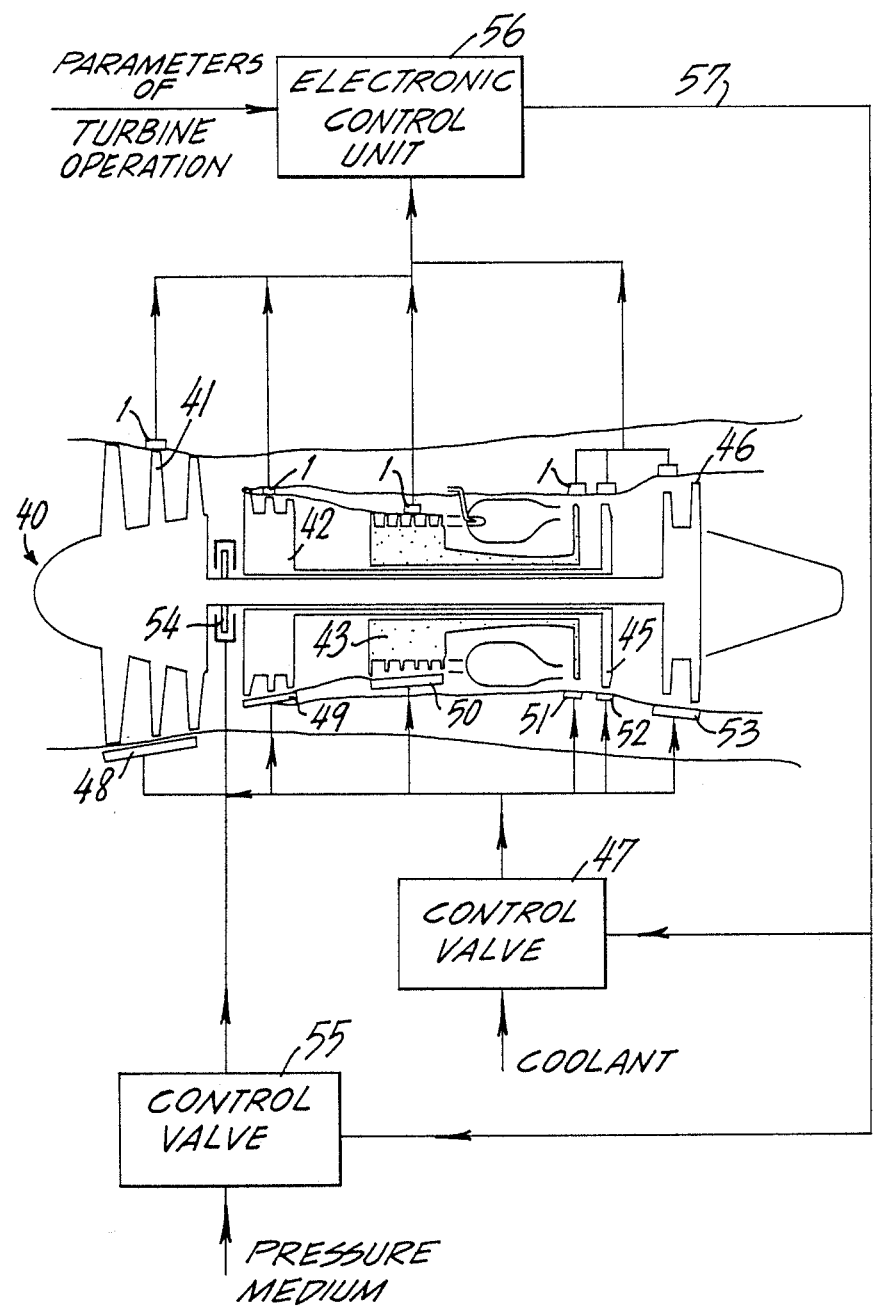
FIG. 9 diagrammatically illustrates the measuring system installed in a turbomachine.

In the system of FIG. 9, there is shown a conventional gas turbine 40 comprising low, medium and high pressure compressor stage 41, 42, 43 respectively and high, medium and low pressure turbine stages 44, 45, 46 respectively. The blades of the rotors of the various compressor and turbine stages are surrounded by the casing of the gas turbine and cooling means in the form of conventional pipes for coolant flow are arranged in the casing to cool the same to control the diameter of the casing and thereby the clearances between the blade tips and the casing. A control valve unit 47 regulates the flow of a coolant, such as compressed air from the turbine or from an external compressor, to respective cooling means in the casing shown at 48, 49 and 50 for the low, medium and high pressure compressor stages respectively and at 51, 52 and 53 for the high, medium and low pressure turbine stages respectively.

A conventional hydraulic or pneumatic actuator cylinder 54 serves to adjust the clearance between the blade tips of the rotors and the casing by displacement of the casing and control of the cylinder 54 is effected by a control valve unit 55 which regulates the supply of a pressure fluid such as compressed air or a liquid medium from the turbine or from an external pressure source.

The valve units 47 and 55 are connected to an electronic control unit 56 by connection lines 57 and the electronic control unit 56 controls the valve units on the basis of input signals fed to the unit 56 indicative of parameters of operation of the gas turbine such as pressure (P), temperature (T) and speed (N) and clearance or gap measurements from sensors 1 disposed in the casing at the compressor and turbine stages.

Heretofore, when using conventional sensors in the system shown in FIG. 9 a number of disadvantages where found. Namely:

due to the coaxial construction of the conventional sensors high stray capacitance values were produced along with high sensitivity to vibrations;

the conventional sensors are of large size (diameter and length) and therefore have limited possibilities of installation.

the sensors have a small range of temperature use due to the insulator materials used and therefore low strength and low electric insulation resistance at elevated temperature;

the sensors have poor precision of measurement in the case of a wide range of temperature of use since insulator materials of high coefficients of thermal expansion are used.

By utilizing the sensors of the invention, the disadvantages are overcome. Namely:

due to the triaxial construction low stray capacitance is obtained since the inner shield can be kept actively at the potential of the active sensor face and there is little sensitivity to vibration;

the sensor of the invention is of small structural size (diameter and length) and has a wide range of use;

the insulating materials and connecting techniques used in the sensor of the invention provide a wider range of temperature of use, high strength, pressure-tight properties up to high pressures of the order of 40 bar, high electrical insulation resistance greater than 500 kOhms over the entire temperature range, high precision of measurement by exact fixing of the active sensor face with materials of low coefficient of thermal expansion;

the front face 18 of the sensor is adaptable to the contour of the casing after the manufacture of the sensor without impairing the electrical and mechanical properties of the sensor;

the connection with the triaxial cable can be axial or at 90° to achieve high flexibility for adaption an existing casings; and the cable is an integral part of the sensor such that in high temperature operations, the sensor and cable can be connected by a vacuum soldering process which provides high reliability.

In general the efficiency of turbomachines such as jet engines, in aircraft or in stationary power plants is substantially affected by size of the rotor clearances, i.e. the clearance between the tips of the blades of the rotor and the casing or between the tips of the stator vanes and the shaft as exemplified in the graphs in FIGS. 1a and 1b. A minimizing of these clearances for all operating conditions of the machine (steady-state/transient state; partial load/full load) and over the entire life of the machine results in considerable improvement in efficiency.

The current conventional method of active clearance control in power turbines by cooling the casing has the following disadvantages:

the clearance can be minimized only in steady-state operating points after a long period of stabilization; otherwise, there is the danger of scraping the rotors against the casing;

the relationship between the power plant parameters which are required for clearance control and the actual rotor clearance changes as a result of wear; therefore, the clearance is not optimally controllable over the entire operating life of the machine since the change in this relationship cannot be determined.

The invention is based on the following:

measurement of the actual operating clearance for the individual components (compressor, turbine; LP, HP, axial or radial) of the power plant 40 for instance, by the capacitive clearance measurment system in accordance with Ser. No. 773,261.

processing of the clearance information together with other engine parameters in electronic unit 56, with microprocessor control, to control valve units 47, 55.

minimizing the clearances separately for the individual wall components of the casing by cooling means 48–53 or by displacement in the case of conical casings by means of actuator cylinder 54.

Variations in the embodiments illustrated and described above can be made within the scope of the present invention. Applications other than those described above are also practicable. The measuring system can be fully automated as regards operational control, evaluation and error control, and it can be operated on several channels. The inventive concept is not limited to turbomachines, but is generally applicable to prime movers and machinery and can be used as a gap measuring sensor on machine tools or in manipulating systems, such as robots.

What is claimed is:

1. In a capacitive measuring system for measuring the clearance between a movable part and a fixed casing facing the movable part wherein a sensor is secured in said casing and has an active face facing the movable part, said sensor and said movable part constituting a capacitor whose charge is representative of said clearance, a charge amplifier, a triaxial cable connecting the sensor to the amplifier, the triaxial cable having a central conductive core and two surrounding conductors insulated from one another and from said core, and electronic means for producing values of said clearance based on the charge values, the improvement wherein the said sensor comprises a central body of a cylindrical or a disk-like shape with a surface constituting the active face of the sensor, wherein at least a top layer of said surface is platinum, connecting means connecting the central body of the sensor to the core of the triaxial cable such that the triaxial cable extends perpendicular to said sensor, two conductive shields surrounding said central body and connected to respective conductors of said triaxial cable, insulation means of ceramic or glass between the central body and said conductive shields, and means including a threaded connection securing said sensor with axial adjustment in the casing, said means further including a turnable outer nut supported by said casing and a lock nut secured to said sensor, said threaded connection being between said outer nut and lock nut and providing axial adjustment of the sensor in said casing upon turning of said outer nut.

2. The improvement as claimed in claim 1 wherein said connecting means comprises a weld.

3. The improvement as claimed in claim 1 wherein said connecting means comprises a high temperature solder connection.

4. The improvement as claimed in claim 1 wherein said metal of the conductive shields comprises Inconel or Vacon.

5. The improvement as claimed in claim 1 wherein the face of the sensor facing the movable part including the face of said core is flush with the surface of the wall.

6. The improvement as claimed in claim 1 wherein said electronic means comprises a voltage generator, said charge amplifier and voltage generator being combined into a common assembly unit together with the sensor and its cable.

7. The improvement as claimed in claim 1 wherein the capacitive measuring system is incorporated into an active clearance control system including controllable portions of a stator relative to a rotor.

8. The improvment as claimed in claim 7 wherein the active clearance control system includes electronic control means receiving parameters of operation of the system, said sensor being connected to said electronic control means to provide signals thereto indicative of clearance between the casing and movable part, means for effecting relative displacement between the casing and movable part to vary the clearance therebetween, and valve means operatively connected to the electronic control means and to the means which effects relative displacement between the casing and movable part in order to control said relative displacement.

9. The improvement as claimed in claim 8 wherein said means for effecting relative displacement between the casing and movable part comprising a cooling means in said casing, said valve means controlling coolant flow to said cooling means which, in turn, controls said clearance.

10. The improvement as claimed in claim 1 wherein said insulation means comprises aluminum oxide ceramic.

11. The improvement as claimed in claim 1 wherein said outer nut includes a threaded stud threadably engaged with said lock nut.

12. The improvement as claimed in claim 11 further comprising releasable holding means for securing said outer nut to said casing to prevent turning of said outer nut.

13. The improvement as claimed in claim 12 comprising a socket extension fixed to said sensor at an end thereof remote from said active face and extending at right angles thereto, said triaxial cable being engaged in said socket extension.

* * * * *